(12) United States Patent
Khojastepour et al.

(10) Patent No.: US 10,943,419 B2
(45) Date of Patent: Mar. 9, 2021

(54) PHYSICAL STRUCTURE, STATE MACHINE, AND CONCEPTS OF A RFID WALK-THROUGH GATE

(71) Applicant: NEC Laboratories America, Inc., Princeton, NJ (US)

(72) Inventors: Mohammad Khojastepour, Lawrenceville, NJ (US); Mustafa Arslan, Princeton, NJ (US); Sampath Rangarajan, Bridgewater, NJ (US)

(73) Assignee: NEC CORPORATION

( * ) Notice: Subject to any disclaimer, the term of this patent is extended or adjusted under 35 U.S.C. 154(b) by 0 days.

(21) Appl. No.: 16/689,663

(22) Filed: Nov. 20, 2019

(65) Prior Publication Data

US 2020/0265660 A1    Aug. 20, 2020

Related U.S. Application Data

(60) Provisional application No. 62/806,149, filed on Feb. 15, 2019.

(51) Int. Cl.
| G07C 9/00 | (2020.01) |
| G07C 9/28 | (2020.01) |
| H01Q 1/12 | (2006.01) |
| E06B 11/02 | (2006.01) |
| G06K 7/10 | (2006.01) |
| H04W 4/80 | (2018.01) |
| E06B 11/08 | (2006.01) |
| G07C 9/15 | (2020.01) |
| G07C 9/27 | (2020.01) |

(52) U.S. Cl.
CPC ............. *G07C 9/28* (2020.01); *E06B 11/02* (2013.01); *E06B 11/085* (2013.01); *G06K 7/10386* (2013.01); *G07C 9/15* (2020.01); *G07C 9/27* (2020.01); *H01Q 1/1214* (2013.01); *H04W 4/80* (2018.02)

(58) Field of Classification Search
CPC ........................................................ G07C 9/00
See application file for complete search history.

(56) References Cited

U.S. PATENT DOCUMENTS

| 7,810,450 B2 * | 10/2010 | Sensenig ............... A01K 1/0017 119/14.03 |
| 8,079,515 B2 | 12/2011 | Kocznar et al. |
| 9,243,449 B1 | 1/2016 | Ziemkowski et al. |
| 10,096,181 B2 * | 10/2018 | Reymann ................ E05F 15/76 |
| 2006/0213992 A1 * | 9/2006 | Ishikawa ................... G07C 9/10 235/451 |
| 2009/0032585 A1 | 2/2009 | Kocznar et al. |
| 2011/0001606 A1 | 1/2011 | Charych |

(Continued)

*Primary Examiner* — K. Wong
(74) *Attorney, Agent, or Firm* — Joseph Kolodka

(57) ABSTRACT

A walk-though gate (WTG) is presented. The WTG includes a WTG structure including a first wall and a second wall, the first and second walls defining a walk though pass way between an entrance and exit, at least one sensor located at the entrance and the exit of a cavity defined by the walk though pass way, at least one first antenna facing toward an inside region of the WTG structure, at least one second antenna facing away from the inside region of the WTG structure, an RFID reader connected to the at least one first and second antennas, and a judgement module to judge if an RFID tag is located inside or outside the walk though gate structure.

17 Claims, 11 Drawing Sheets

(56) References Cited

U.S. PATENT DOCUMENTS

| | | |
|---|---|---|
| 2016/0042333 A1 | 2/2016 | Ho et al. |
| 2017/0055157 A1 | 2/2017 | Bergdale et al. |
| 2020/0265661 A1* | 8/2020 | Khojastepour .......... G07C 9/15 |

* cited by examiner

PHYSICAL STRUCTURE, STATE MACHINE, AND CONCEPTS OF A RFID WALK-THROUGH GATE

RELATED APPLICATION INFORMATION

This application claims priority to Provisional Application No. 62/806,149, filed on Feb. 15, 2019, the contents of which are incorporated herein by reference in their entirety.

BACKGROUND

Technical Field

The present invention relates to walk-through gates and, more particularly, to methods and systems related to a radio frequency identification (RFID) walk-through gate.

Description of the Related Art

Radio frequency identification (RFID) tags are electronic devices that can be affixed to items whose presence is to be detected and/or monitored. The presence of an RFID tag, and therefore the presence of the item to which the RFID tag is affixed, may be checked and monitored by devices known as "readers" or "reader panels." Readers usually transmit radio frequency signals to which the RFID tags respond. Each RFID tag can store a unique identification number. The RFID tags respond to reader-transmitted signals by providing their identification number and additional information stored on the RFID tag based on a reader command to enable the reader to determine an identification and characteristics of an item.

SUMMARY

A walk-through gate is presented. The walk-through gate includes a WTG structure including a first wall and a second wall, the first and second walls defining a walk though pass way between an entrance and exit, at least one sensor located at the entrance and the exit of a cavity defined by the walk though pass way, at least one first antenna facing toward an inside region of the WTG structure, at least one second antenna facing away from the inside region of the WTG structure, an RFID reader connected to the at least one first and second antennas, and a judgement module to judge if an RFID tag is located inside or outside the walk though gate structure.

A walk-through gate is presented. The walk-through gate includes a WTG structure including a first wall and a second wall, the first and second walls defining a walk though pass way between an entrance and exit, at least one sensor located at the entrance and the exit of a cavity defined by the walk though pass way, at least one first antenna facing toward an inside region of the WTG structure, at least one second antenna facing away from the inside region of the WTG structure, an RFID reader connected to the at least one first and second antennas, a judgement module to judge if an RFID tag is located inside or outside the walk though gate structure, and curved surface structures included in both the first and second walls of the WTG structure.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
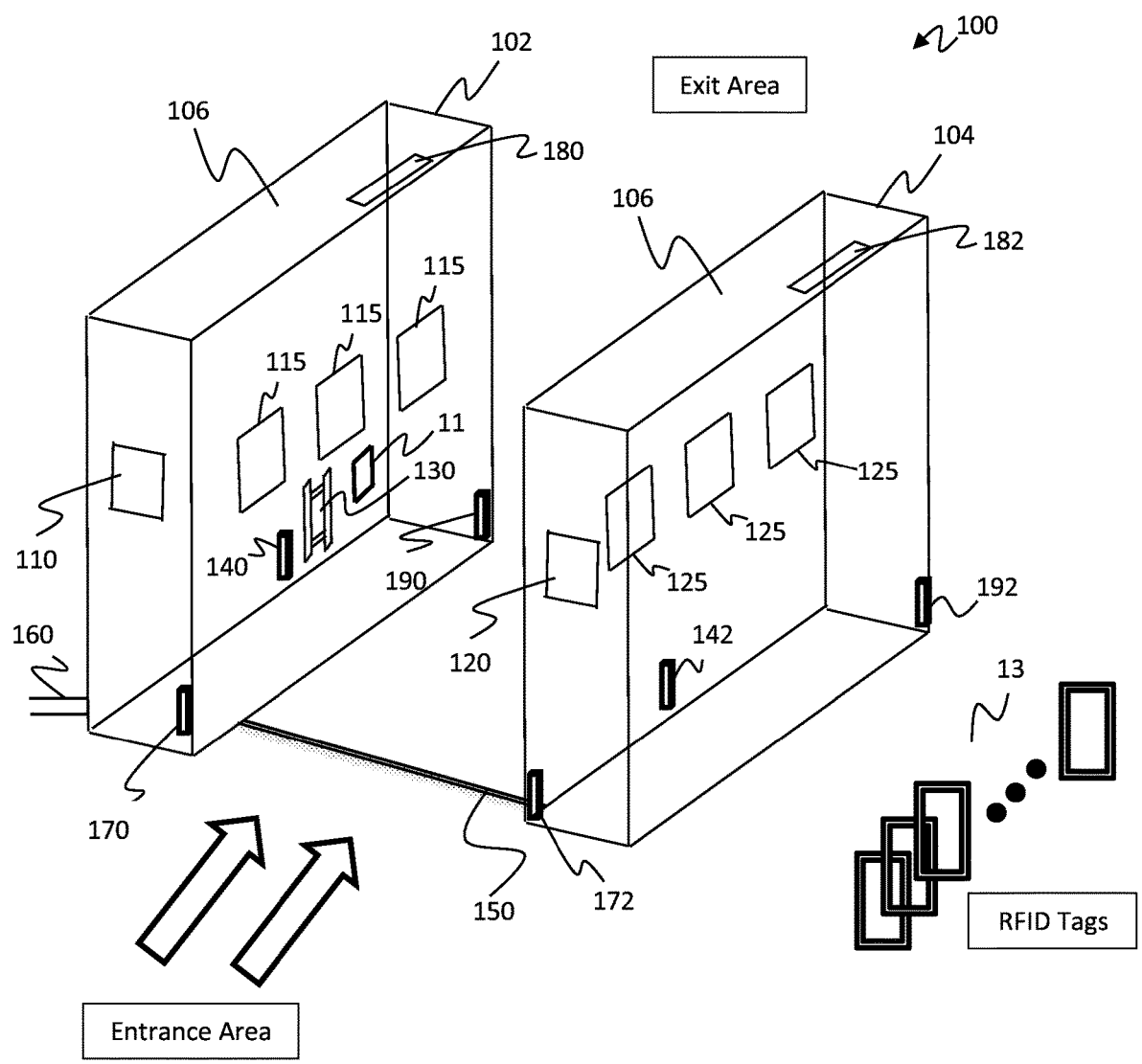
FIG. 1 is a block/flow diagram of an exemplary walk-through gate (WTG) including a plurality of antennas and sensors, in accordance with embodiments of the present invention.

A Walk Through Gate (WTG), as shown in FIG. 1, includes multiple physical components with a particular structure, as well as software components that implement the tag detection and classification algorithm. There are several concepts described herein defining variables or parameters of the WTG, such as session, inside, outside, late billing, sequential detection, etc., and the attributes that are related to them, such as, maximum session time, minimum session time, decision window, etc.

A Walk Through Gate (WTG) is an extended walk-way between two walls with a height of A, thickness of B, and length of L, e.g., 130 cm. The width of the walk-way between the two walls is W, e.g., 75 cm. The volume between the two walls and the volume directly above that up to a given height, say H, is defined as "inside" of the WTG and any other position that is not inside the WTG is considered "outside" the WTG.

A "session" is defined as an interval of time to determine the collection of all tags 13 that are inside the WTG 100, 200, 300, 400, 500 (FIGS. 1-5).

The "session duration" is a duration of the time interval in which the session has occurred.

A group of antennas 110, 115, 120, 125 are supposed to read the tags 13 that are inside the WTG 100-500. These antennas 110, 115, 120, 125 are generally placed on the boundary of the inside area of the WTG 100-500 and are oriented toward the inside of the WTG 100-500. These antennas are referred to as "inside antennas." Similarly "outside antennas" are the antennas that are placed close to the boundary of the inside and outside of the WTG and oriented away from the inside of the WTG 100-500. These antennas read the tags 13 that are outside the WTG area.

A "decision algorithm" of a judgement module 11 uses the reading from the inside and outside antennas during a session to decide whether a tag 13 is located inside or outside the tunnel. The process of assigning a label to a tag 13 as being "inside" or "outside" is referred to as "claiming." Through this process, each tag 13 is claimed to be "inside" or "outside" only once and when the decision is reached it will not change. However, a tag 13 can remain unclaimed for a duration of the time until enough reading is reached or enough time has elapsed. Any tag 13 that has been read once is referred to as a "pending tag" while it has not yet been claimed.

A person "enters" the WTG 100-500 when such person moves from the outside region to the inside region of the WTG 100-500. A person "exits" the WTG 100-500 when such person moves from the inside region to the outside region. It is assumed that once a user enters the WTG 100-500, the user does not bring in any new tags inside the WTG or throws out any tags that the user already has with them.

A session has a beginning where it marks the time that the items of interest are all within the WTG 100-500. The "session start time" has to precisely mark the time where only the items of interest are inside the WTG 100-500. This means that all the items of interest are within the WTG and no extra tag is within the WTG.

A session also has a "minimum session duration," which indicates that in order to achieve a certain level of reliability in claiming the tags, the method should wait at least for this duration. Hence the software algorithm does not declare a tag to be inside or outside before such minimum session duration.

Since the customer or user cannot be held inside the WTG 100-500 for more than a particular time, there is naturally a "maximum session duration" that when it is reached, the decision has to be made for all pending tags. The customer or user is allowed to walk out of WTG 100-500 when the decision is made and hence the session is ended.

The decision algorithm uses the session start time and dynamically claims the tags that are inside or outside until all the tags that have been read at least once are claimed. At this time, the algorithm reaches the "end of dynamic decision window" and the "dynamic decision window" is the time interval from the session start time until the time that all the tags that have been read at least once are claimed.

It is noted that if the tag is not read even once within the dynamic decision window, it will not be claimed. This is referred to as "one read requirement." In an application of the WTG 100-500 where the WTG 100-500 is interested only in the inside tags, the issue is only aroused when an inside tag has never been read by any antennas. The physical design should avoid such cases unless if the tag is physically blocked, e.g., by hand or a metal shield or somehow disabled or destroyed. In general a tag 13 can be claimed inside or outside WTG 100-500 and in case that there are more than two regions (inside or outside), e.g., when multiple WTGs are concurrently deployed, the tag is claimed in one of their regions such as inside of a particular WTG or outside of a particular WTG.

In such applications, such as illustrated in WTG 100-500, the term "claimed" can be used to refer to "claimed inside" where there is no confusion. Otherwise, the terms "claimed inside" or "claimed outside" can be used.

A session can have a "session end time," which is defined as the time that the customer or user exits the WTG 100-500. The session end time can be reached before or after the end of the dynamic decision window. If the "session end time" reaches before the end of dynamic decision window, the algorithm may not make a decision and raise an alarm. However, if the "session end time" occurs after, the algorithm can reconsider all the decisions based on all readings until the "session end time" to make a new claim for all tags or possibly change a claimed tag from "inside" to "outside," or vice versa.

It is noted that the "session" is not defined on a per tag basis. In other words, the WTG 100-500 cannot have two different sessions that partially overlap. If two sessions overlap, they entirely overlap. This means that the WTG 100-500 cannot be continuously operated by passing the tags through the WTG 100-500 where a new tag enters the WTG 100-500 while there is still one pending tag with the WTG.

The WTG 100-500 can be used to find out which set of tags 13 (and their associated objects) move from one side of the WTG 100-500 to the other side. The operation includes generating the "session" based on the "transit time" of the tags 13 within the WTG 100-500. Making a decision about the tags 13 that are inside the tunnel and based on which side of the tunnel is crossed at the "session start time" and which side is crossed at the "session end time," it can be inferred which set of tags have been moved from which side of the WTG to another side. This process can also cover the cases that a set of items enter from one side and exit from the other side or the situation where the items enter from one side and exit from the same side.

In FIG. 1, the WTG 100 includes a first wall 102 and a second wall 104. The first wall 102 includes an entrance sensor 170 and an exit sensor 190. The second wall 104 includes an entrance sensor 172 and an exit sensor 192. The first wall 102 further includes 8 antennas 110, 115. Antennas 110 are positioned on a front and back surface of the first wall 102, whereas antennas 115 are positioned on side walls of the first wall 102. Similarly, the second wall 104 further includes 8 antennas 120, 125. Antennas 120 are positioned on a front and back surface of the second wall 104, whereas antennas 125 are positioned on side walls of the second wall 104. The first wall 102 further includes an RFID reader/writer 130, as well as an antenna hub 140 and a judgement module 11. Similarly, the second wall 104 also includes at least an antenna hub 142.

A coaxial cable 150 connects the first wall 102 to the second wall 104 of the WTG 100. The coaxial cable 150 is positioned near the entrance of the WTG 100. The entrance is designated by the arrows.

The first wall 102 also includes a local area network (LAN) cable 160.

The first and second walls 102, 104 of the WTG 100 are constructed from aluminum frames and can include acrylic boards or aluminum boards 106.

In one exemplary embodiment, the first wall 102 includes a session lamp 180 at a top surface of the first wall 102 and the second wall 104 includes a session lamp 182 at a top surface of the second wall 104.

The marking of "session start time" may be performed in 5 different ways. In an original design of the WTG, the entrance door in one side and the exit door in the other side of the tunnel could be used to mark the "session start time" and "session end time," respectively.

Without such doors, it is possible to use cameras. The proper way of using a camera is to follow a person and mark the "session start time" after the person has entered the WTG. Also, the "session end time" is the time that the person exits the inside of the WTG. If the camera is unable to make such precise distinction at the right time, it is possible to use other instruments, such as sensors.

If sensors are employed, one sensor could be used at the WTG entrance to mark the "session start time" and another sensor can be employed at the exit to mark the "session end time." This allows for the detection of double entry. Once a person crosses the entrance, the sensor, e.g., an ultraviolet sensor, light detection and ranging (LIDAR), or ultrasound sensor, can detect such entry and indicate that the "session" is started. Since a "session" is in progress, any other crossing through the entrance of the gate is considered a violation because two sessions should either be totally overlapped or disjointed.

Either or both of the session start and end can be enabled explicitly by customer interaction such as pressing a key or physical button, interacting with a touch screen display or reading a customer ID card, which can be enabled through magnetic tapes (such as credit cards), chips, RFID tags, or visual codes such as barcode or quick response (QR) code. The customer ID card can be a virtual ID card stored in a personal device, such as smartphone.

The combination of the physical sensors and the algorithm of WTG is designed such that the "session start time" and the "session end time" are marked correctly, it can detect if the user exits the WTG through the entrance, it detects if another user enters the WTG before the current user in WTG exits, and it detects if the user enters from the exit side of the WTG.

One point is the fact that the crossing of the entrance detected by a sensor does not indicate the direction of the crossing, e.g., if the customer is returning back to the store through the entrance door, e.g., to pick up more items. One possible solution is to use multiple sensors or different type of sensors that can also indicate the direction of the movement when the entrance or the exit of WTG is crossed. A camera can also be used to detect the direction of the movement of the customer.

The other point is that if one can allow for modification of a session by appending time which means that if there is an interactive console with the customer, the customer can be asked if the session can be resumed after a second person enters the gate as well. One scenario is, e.g., when a customer is in the checkout and his partner joins him with a few more items after the session has already been started and it is still in progress.

Antenna positions and orientations play a role in the performance of the WTG. In general there are number of antennas that are used inside at different heights to cover the entire inside region, as well as a number of antennas placed to cover the volume of the outside region which is close to the inside region. Beside the position of the antennas, the sequence in which the antennas are activated and their timing is also of consequence. The rule of thumb in the design of the antenna sequence is to distribute the inside and outside antennas as evenly as possible, e.g., with 6 inside and 2 outside antennas. It is desired to place the reading of one outside antenna after activation of three different inside antennas. Moreover, the antenna sequence is cyclic and each antenna is activated only once during each cycle. The second rule is that, on average, it is desirable to cover the largest volume for any sliding window. This means that the antennas with minimal beam overlap are used in succession and the WTG should avoid using antennas with large beam overlap in adjacent time slots in the antenna sequence.

There are total of 6 antennas inside numbered from one to six plus two additional antennas for outside facing toward the entrance of the WTG numbered 7 and 8. An example of the proposed antenna sequencing is 1; 5; 3; 8; 4; 2; 6; 7, which replaces a default sequence of 1; 2; 3; 4; 5; 6; 7; 8.

It was noted above that the WTG works within the concept of a "session." The "session" is defined as an interval of time where the tags 13 of interest are either inside or outside the WTG 100-500 and the tags 13 do not cross the boundary to move from inside to outside or vice versa. Thus, sensors are deployed at the entrance and exit of the WTG 100-500 in order to provide the information about the "session start time" and "session end time" to the software component of WTG 100-500.

The placement of the sensors should be right at the boundary of the entrance and exit area of WTG. The height of the sensor is proposed to be about 50 cm from the ground where an average person will be detected once such person crosses the entrance or exit area of the WTG. FIG. 1 provides a schematic of the proposed placement of ultraviolet sensors 170, 172 at the entrance of the WTG system 100. This can be similarly done at the exit side of the WTG 100, where sensors 190, 192 are positioned.

The sensor alone or the combination of the sensor hardware and the software module should provide a regulated indication of when a valid crossing has happened. For example, if the sensor is placed too low, once a person crosses, the sensor can detect more than one crossing event due to the crossing of both legs.

In order to indicate that the WTG is "in session" or "not in-session," an indicator lamp 180, 182 can be used. Such indicator lamps 180, 182 should be visible to the person attempting to enter the WTG area as well as the person who is anywhere inside the WTG area. Hence, it is advised to use the session indicator lamps 180, 182 on top of the walls 102, 104 closer to the exit area (FIG. 1).

It is also possible to use multiple lamps that are controlled with the same signals, e.g., one at the entrance and one at the exit area. The lamp can simply use on and off or multiple colors such as "green" and "red." For example, when the light is "green," it means that the WTG is free and not in session and as soon as a person enters the WTG area and the session starts, the lamp turns "red" indicating that the WTG is in session. Once the person moves out of the WTG area, the session indicator lamp will turn green indicating that the WTG is free again. In order to indicate when a customer may walk out of the inside of the WTG area, the WTG can deploy a sound activated note or use a display device or both to let the customer know that the checkout process has finished. This may or may not include asking for a form of payment or confirming a possible payment method that is already in file for VIP customers.

Figure 2:
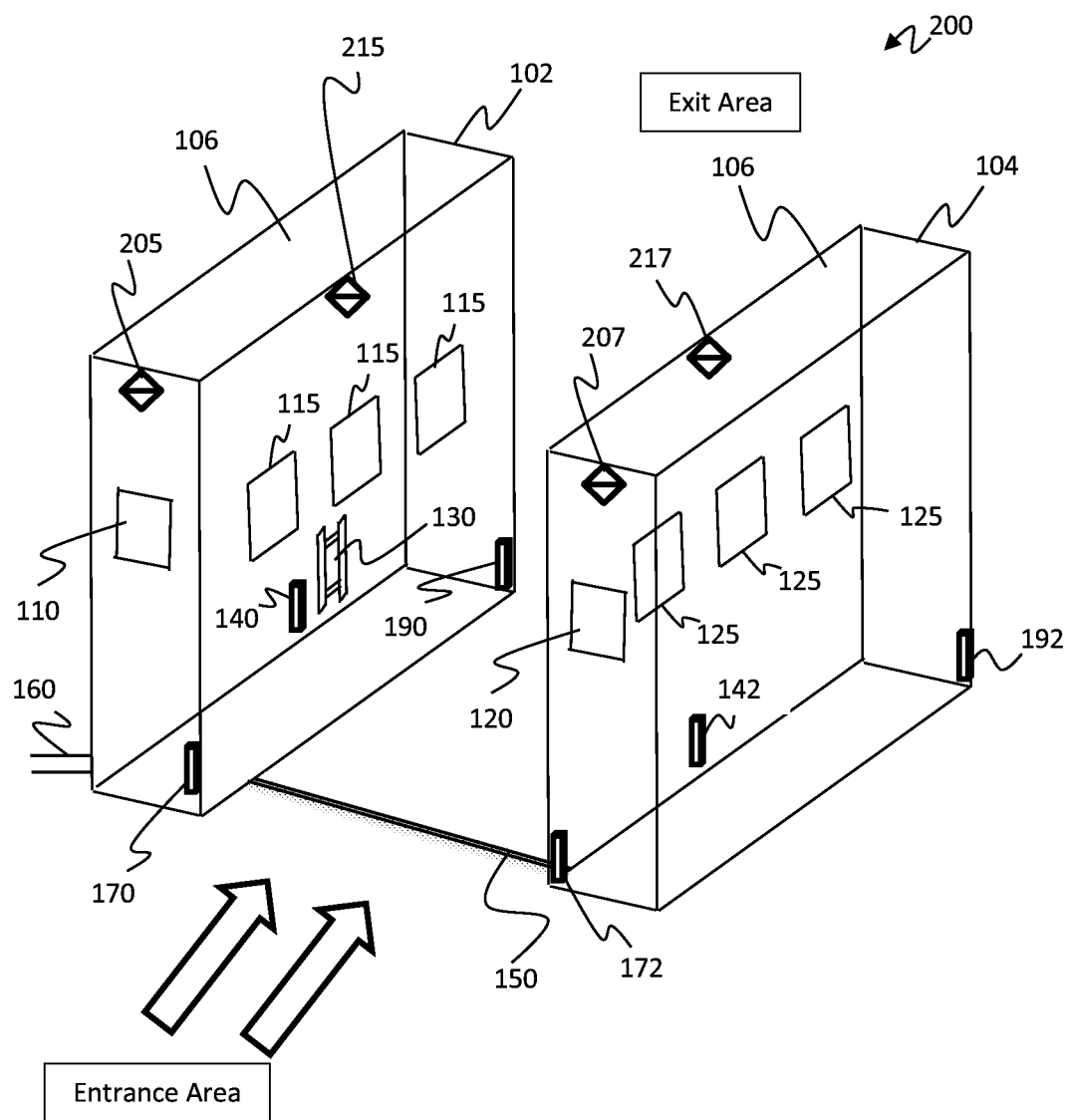
FIG. 2 is a block/flow diagram of an exemplary WTG where session indicator lamps are positioned at a top portion of each of the walls of the WTG, in accordance with embodiments of the present invention.

FIG. 2 shows an alternative configuration 200 of the session lamps.

In FIG. 2, session lamps 205, 207 can be placed at the entrance of the first and second walls 102, 104, respectively.

Additionally, session lamps 215, 217 can be placed on inner top surfaces of the first and second walls 102, 104, respectively.

A more advanced implementation of the session indicator lamp is to implement two lamps. That is, as shown in FIG. 3, one for the entrance session indicator lamp 305, 307 and the other one for the exit session indicator lamp 315, 317.

If the entrance session is "green," it denotes that the WTG 300 is free and ready to provide service. While there is nobody inside the WTG 300, the exit session indicator lamp is also "green." As soon as a person enters the area inside the WTG 300, both entrance and exit session indicator lamps turn "red" indicating that the WTG 300 is "in session" and "busy." As soon as the end of dynamic decision window is reached and/or the maximum session duration time is reached, the decision about all the pending tags 13 has been finalized, and the exit session indicator lamp turns "green," which means the customer can exit the inside of the WTG area.

Figure 3:
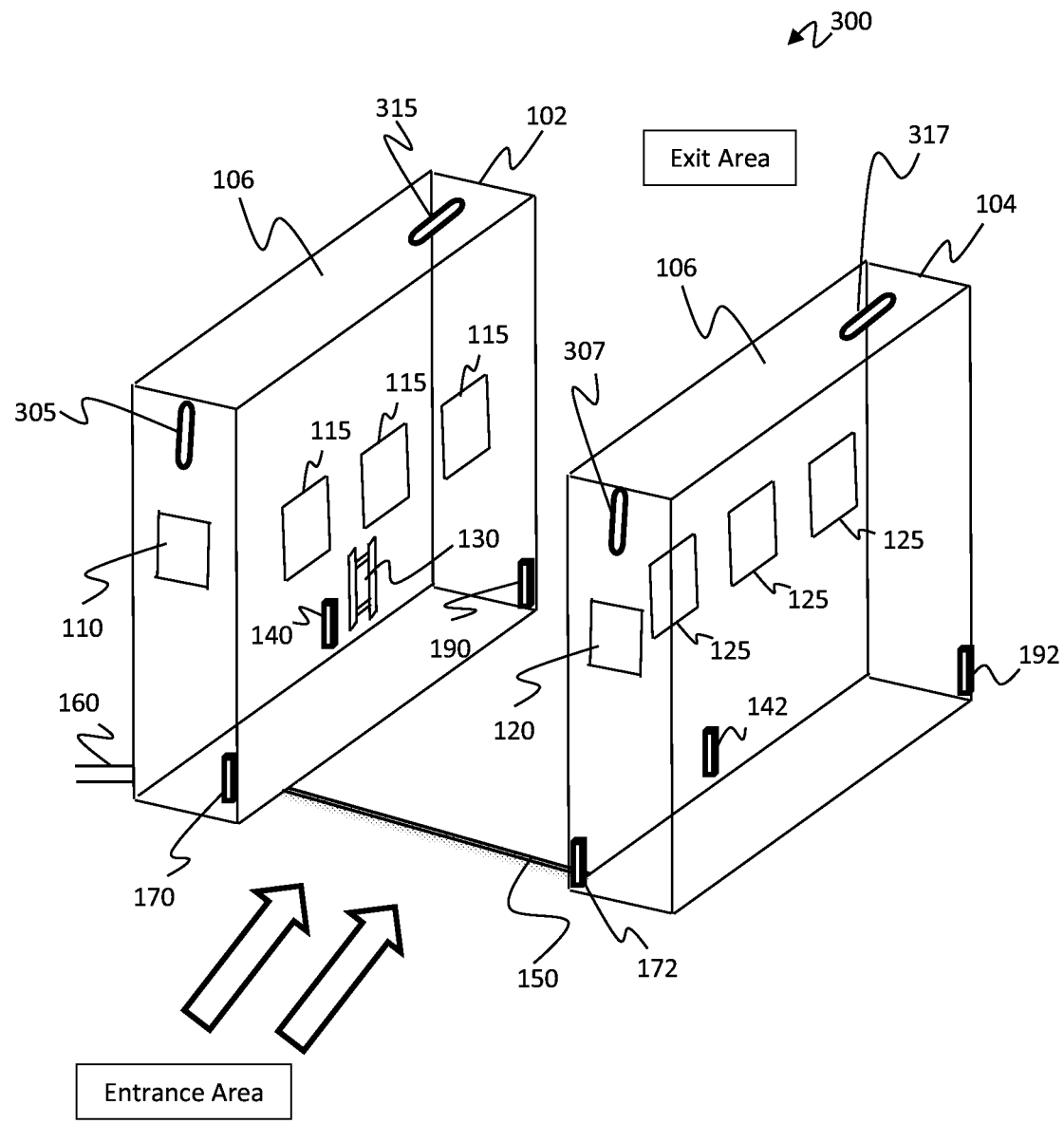
FIG. 3 is a block/flow diagram of an exemplary WTG where session indicator lamps are positioned at both the entrance and the exit areas of the WTG, in accordance with embodiments of the present invention.

In this time, the entrance session indicator lamp 305, 307 would still remain "red" until the time that the customer exists the inside area of the WTG and then the entrance session indicator lamp 305, 307 would turn "green." FIG. 3 illustrates a possible positioning of entrance and exit session indicator lamps 305, 307, 315, 317. The entrance session indicator lamps 305, 307 are placed on the front of the walls 102, 104 of WTG structure 300 so that is it visible to the person entering the WTG 300 but not clearly visible to the person already inside of the WTG area. The exit session indicator lamps 315, 317 are placed close to the exit area and on top of the walls 102, 104 of the WTG structure 300. The goal is while this lamp is "red," the customer realizes that such customer cannot exit the WTG area yet.

Figure 4:
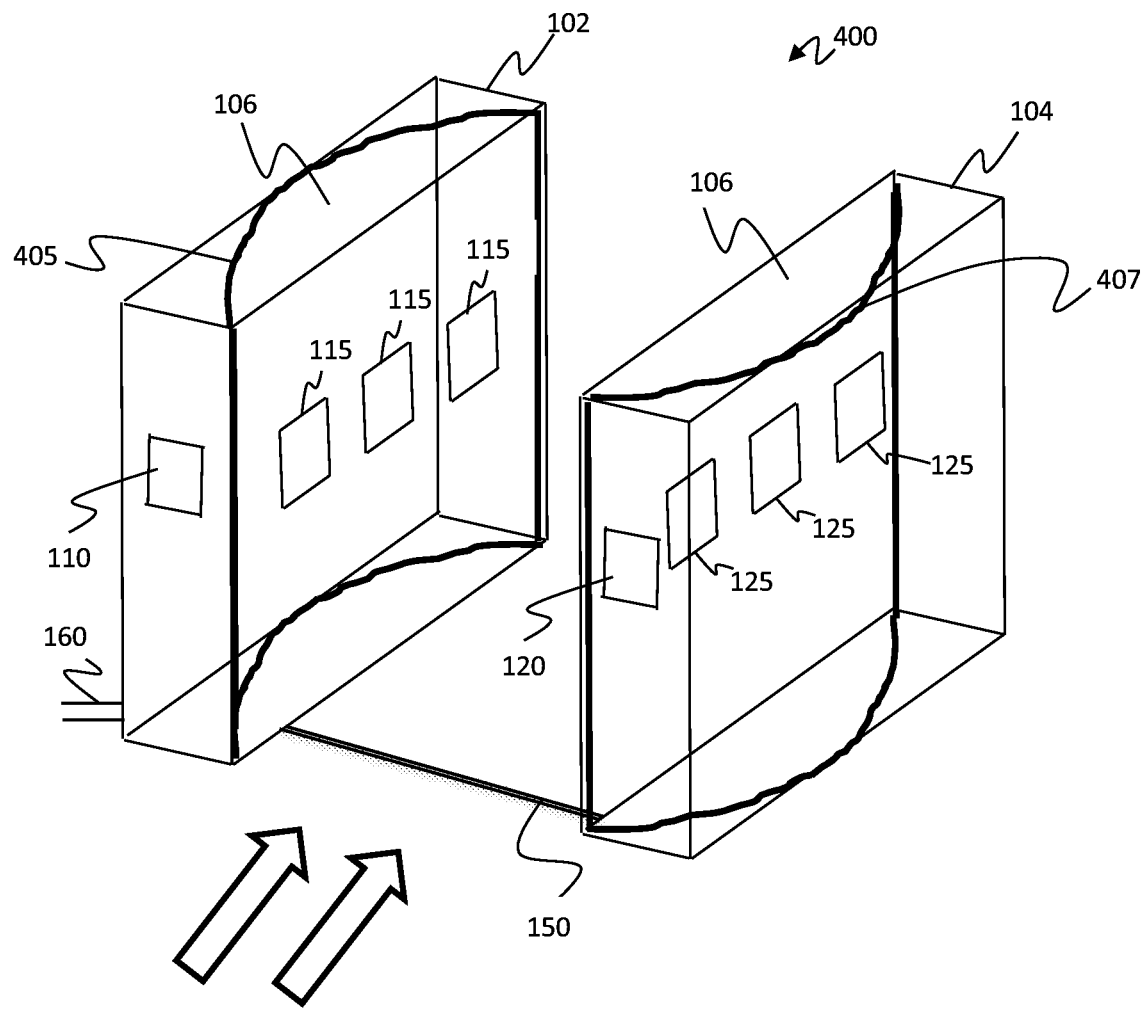
FIG. 4 is a block/flow diagram of an exemplary WTG where curved surface structures are positioned within each wall of the WTG, in accordance with embodiments of the present invention.

Referring to FIG. 4, a block/flow diagram of an exemplary WTG 400 where curved surface structures 405, 407 are positioned within each wall 102, 104 of the WTG 400 is presented.

In order to increase the probability of reading all the tags 13 inside the WTG 100-500 by the inside antennas 115, 125 and avoid reading the outside tags by the inside antennas 115, 125, a particular curved surface is necessary. Such curvature is designed to also minimize the chance of reading an inside tag by an outside antenna. In other words, the curvature tries to physically isolate the inside and outside of the WTG 100-500. Some areas of this curved surface have to be covered by a reflecting material, such as aluminum foil and some other areas may be covered by an RF absorber. In unimodal form, the walls 102, 104 of WTG 100-500 are either made of RF reflecting material with proper curvature or RF absorbing material.

A version of the curved surface is a piece of a cylinder that is cut in parallel to the axis of the cylinder. The angle associated with the arc of this partial cut of the cylinder plays an essential role. Nonetheless, it would still be beneficial if any angle can be put that is possible to place within each wall of the cylinder. The placement in each wall is such that the axis of the cylinder is toward the inside of the WTG 400. FIG. 4 illustrates the curvature structures 405, 407 of the first and second walls 102, 104, respectively.

It is noted that the angle of curvature is dictated by a length (L) and a width (W) of the walls 102, 104. The angle α can be found by solving:

$$(1-\cos(\alpha=2))=2\sin(\alpha=2)=W=L.$$

In theory, an arc of length about $2\pi=3$ would be ideal to maximize the isolating property of the WTG 400.

In a bi-modal form of the curvature parts 405, 407, the curvature can be coated with a reflecting material while some other parts can be formed by employing RF absorbing materials. The goal of the bi-modal curvature is to further enhance the isolating property of the curvature in discriminating between the tags 13 that are placed inside or outside WTG 400. The idea is to reduce the possibility of a reflecting wave to exit or enter the inside area of WTG 400.

Figure 5:
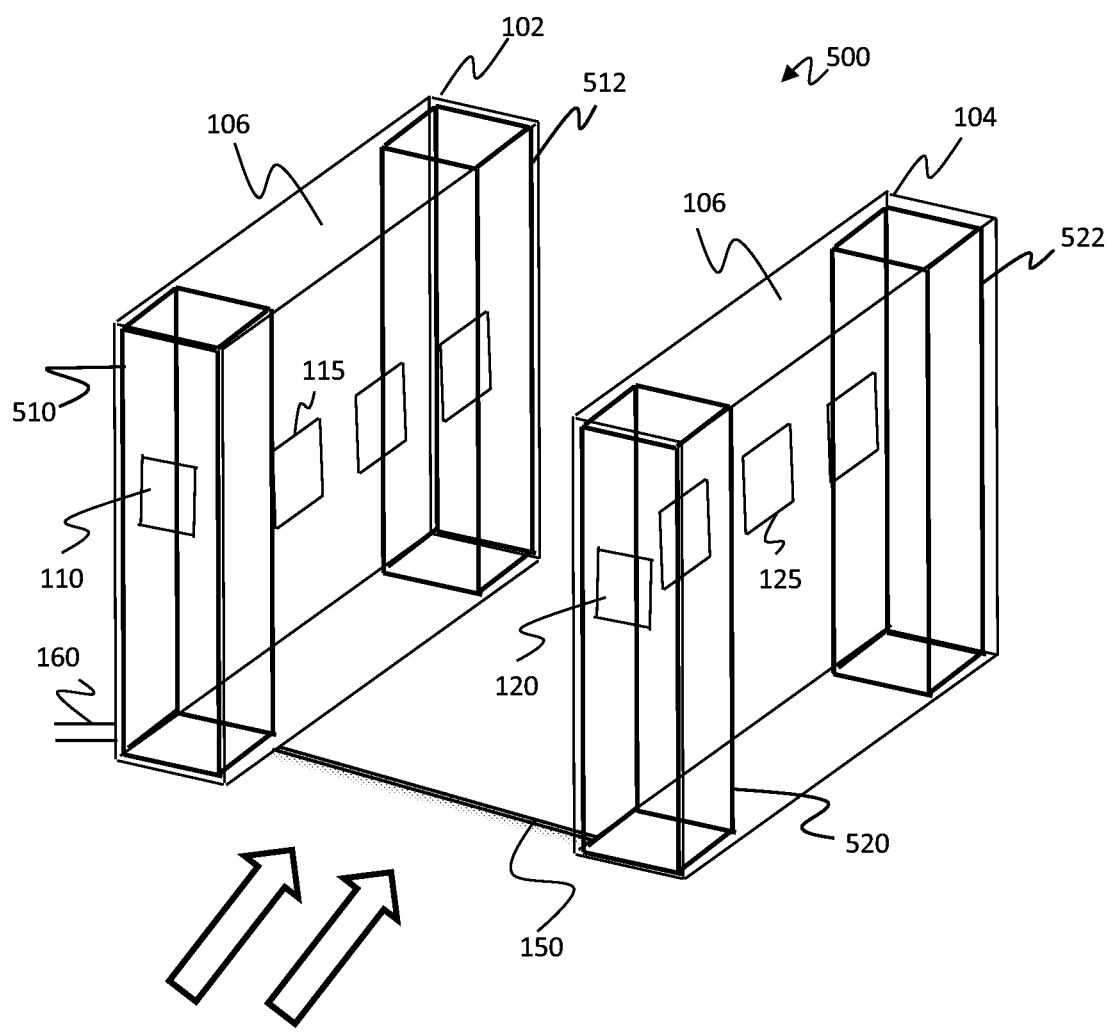
FIG. 5 is a block/flow diagram of an exemplary WTG where absorbers are placed within each wall of the WTG for bi-modal curvature, in accordance with embodiments of the present invention.

FIG. 5 is a block/flow diagram of an exemplary WTG 500 where absorbers 510, 512, 520, 522 are placed within walls 102, 104 of the WTG 500 for bi-modal curvature, in accordance with embodiments of the present invention.

In the bi-modal curvature design, absorbers 510, 512, 520, 522 are placed, e.g., having a thickness of 20 cm, inside each wall 102, 104 and on both sides of the WTG 500 at the entrance and exit. The role of absorbers 510, 512, 520, 522 at the entrance is more beneficial than at the exit since most of the outside tags 13 are in the entrance side of the WTG 100-500.

Some antennas should ideally be placed on the curvature in the orientation that is dictated by the tangent surface to the curvature at the point of contact. However, it is still possible to use antennas anywhere inside the WTG area. However such antennas may generate unwanted reflections that affects the performance.

Figure 6:
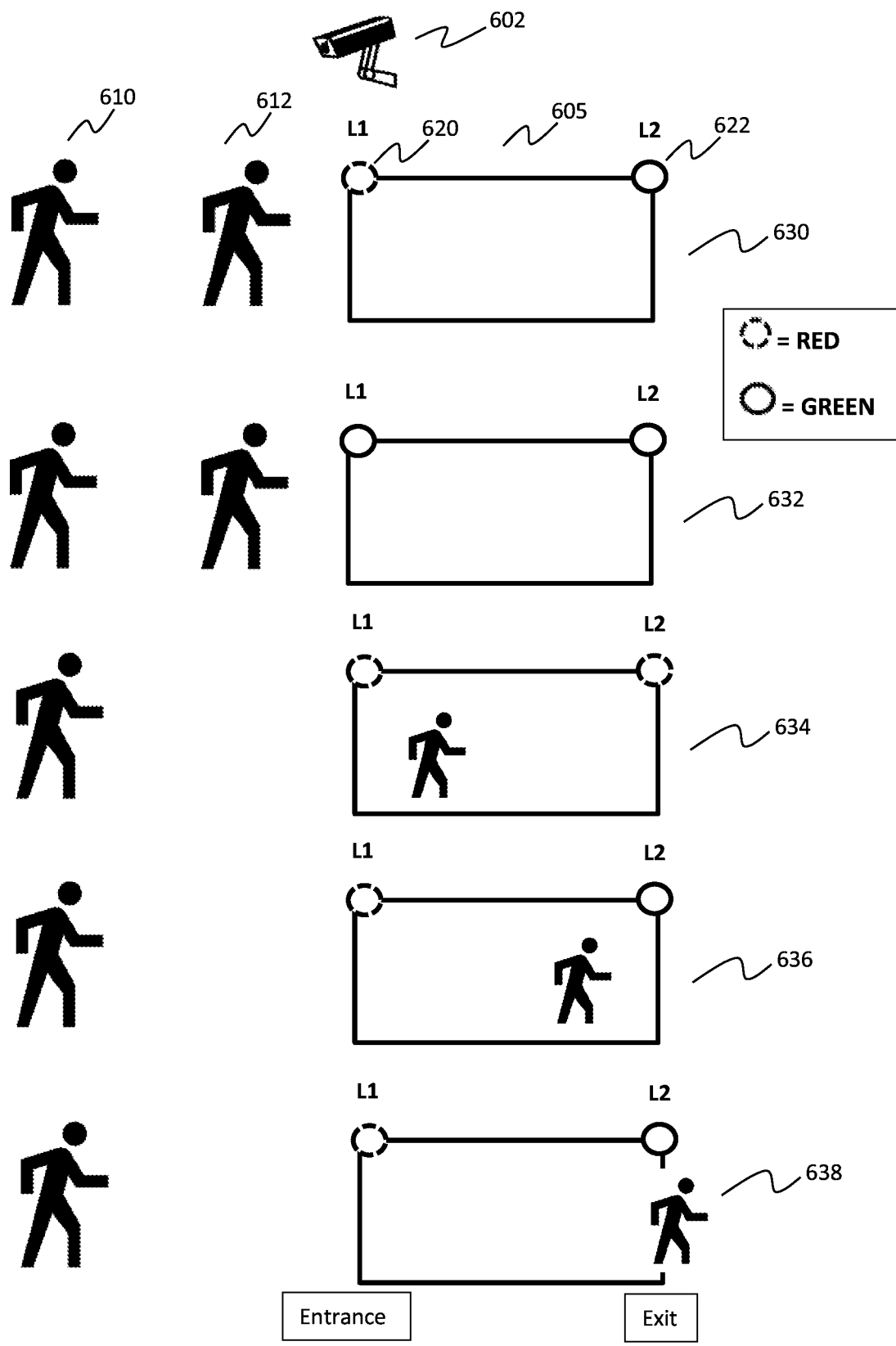
FIG. 6 is a block/flow diagram of an exemplary WTG depicting how session indicator lamps function when a person crosses through the WTG, in accordance with embodiments of the present invention.

In FIG. 6, the system state diagrams of a user journey are presented.

Since user verification is required, it is assumed that the users 610, 612 are already registered, by the camera 602, to be able to use the WTG 605.

Diagram 632, shows that when the user face is verified, both lights 620, 622 are green indicating that user 612 can freely enter.

In diagram 634, as soon as the user 612 enters WTG both lights 620, 622 turn red indicating that the user 612 is inside the WTG 605, cannot exit, and no other user can come in.

In diagram 636, when the reading is complete, only the exit light 622 turns green indicating that the user 612 can exit. However, the internal state clearly does not allow a new face verification to occur.

When the user exits in diagram 638, the lights 620, 622 do not change and remain red at the entrance and green at the exit. Also, the system goes back to the state in diagram 630, which allows for the new face 610 to be verified.

As noted, L1 is the entrance light, L2 is the exit light, S1 is an entrance IR sensor, and S2 is an exit IR sensor.

Figure 7:
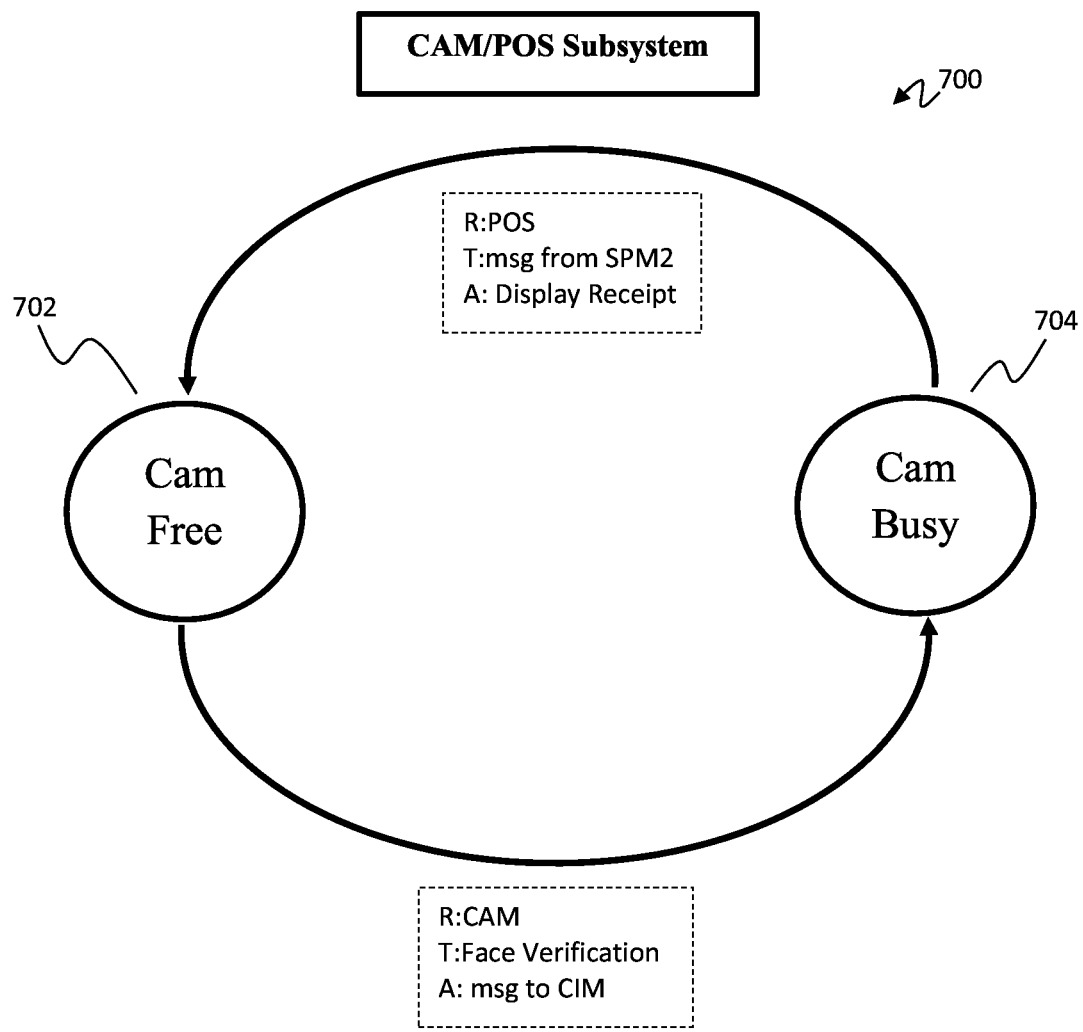
FIG. 7 is a block/flow diagram of an exemplary camera subsystem state diagram, in accordance with embodiments of the present invention.
Figure 8:
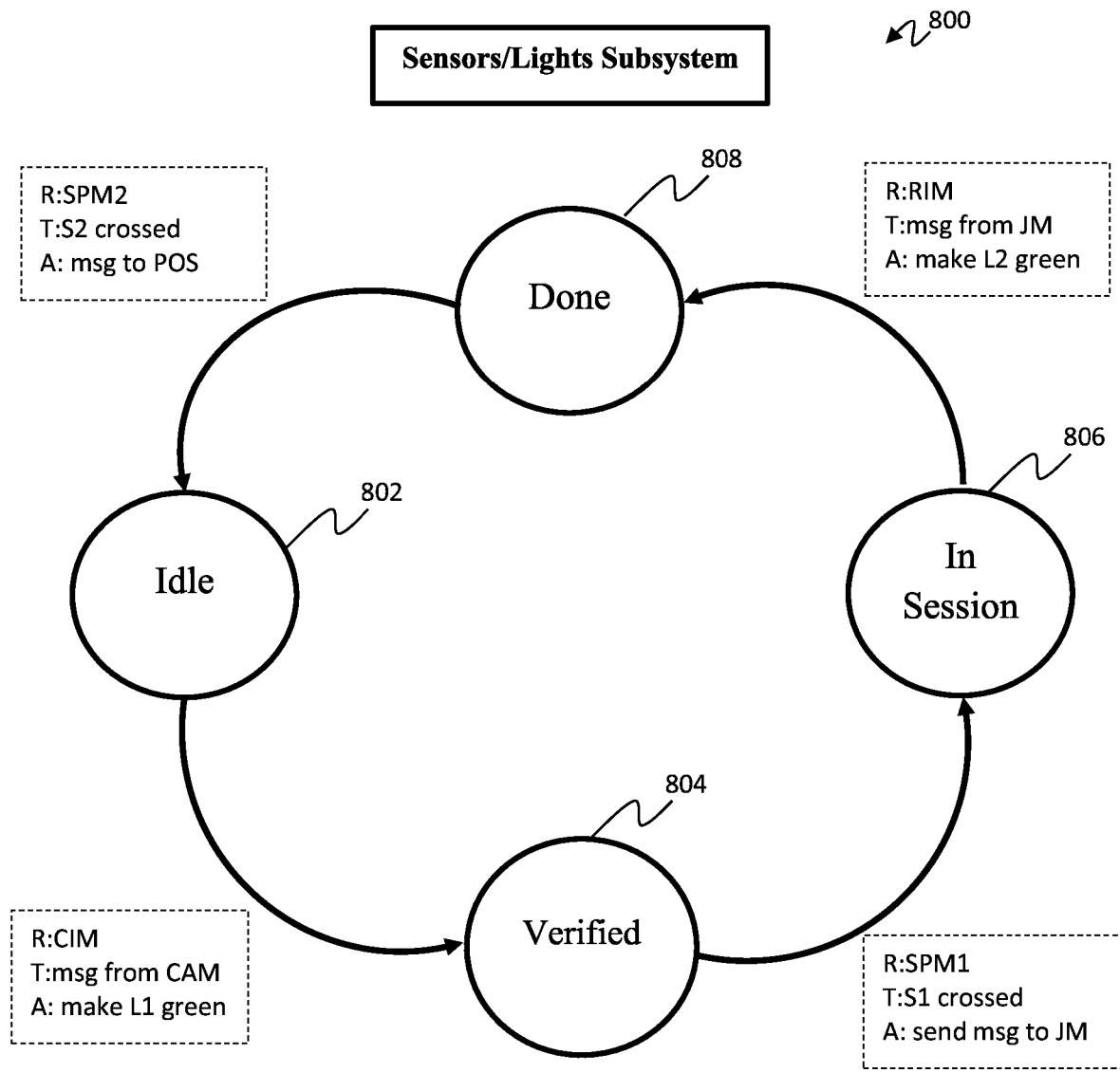
FIG. 8 is a block/flow diagram of an exemplary sensor and light subsystem state diagram, in accordance with embodiments of the present invention.
Figure 9:
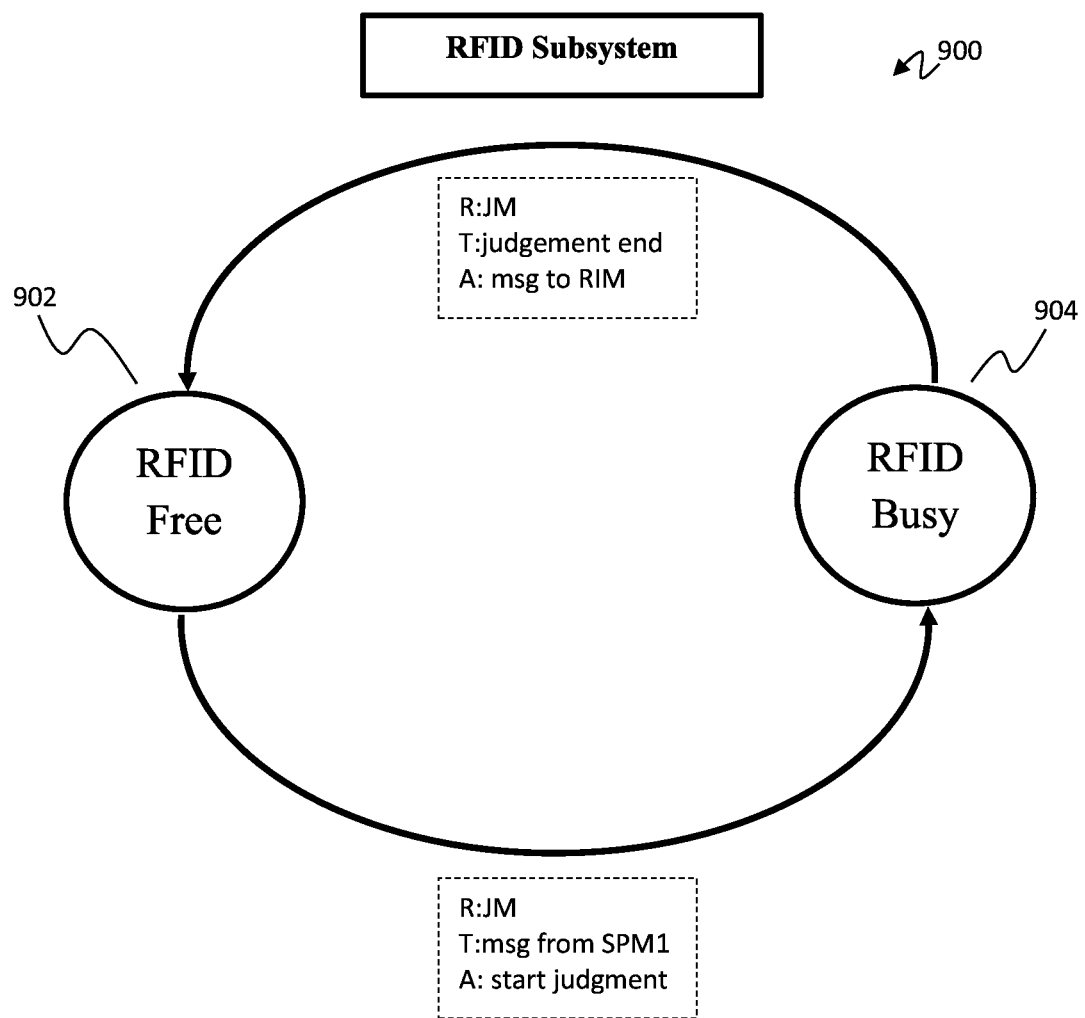
FIG. 9 is block/flow diagram of an exemplary RFID subsystem state diagram, in accordance with embodiments of the present invention.

FIG. 7 is a block/flow diagram of an exemplary camera subsystem state diagram, in accordance with embodiments of the present invention, FIG. 8 is a block/flow diagram of an exemplary sensor and light subsystem state diagram, in accordance with embodiments of the present invention, and FIG. 9 is block/flow diagram of an exemplary RFID subsystem state diagram, in accordance with embodiments of the present invention.

The integration of face recognition, IR sensors, and lights with the WTG is described.

The fully integrated system has to have a certain pre-defined operational sequence. This sequence is realized through a set of events and the set of actions taken in response to those events.

The sequence includes a set of states. The transition from one state to another is made by a software module that carries out an action that could depend on a trigger.

The WTG includes three sub-systems including their hardware and software components, that is, Camera/POS sub-system 700, Sensors/Lights sub-system 800, and RFID sub-system 900.

Camera/POS subsystem 700 includes CAM module and POS module, as well as related hardware components. The states of the Camera/POS subsystem 700 are "CAM Free" state 702 and "CAM Busy" state 704.

Sensors/Lights sub-system 800 includes CIM module, SPM1 module, RIM module, and SPM2 module, S1, S2, L1, and L2, and other related hardware components. The states of the Sensors/Lights sub-system 800 are "Idle" state 802, "Verified" state 804, "In Session" state 806, and "Done" state 808.

RFID sub-system 900 includes the JM module, which is the RFID code and related hardware. The states of the RFID sub-system 900 are "RFID Free" state 902 and "RFID Busy" state 904.

There are three state diagram, one for each sub-system 700, 800, 900.

The initial state for Camera and RFID sub-systems 700, 800 is "Free" state and the initial state for the Sensors/Lights sub-system 900 is "Idle."

The state transition between the subsystems 700, 800, 900 is invoked by communicating messages through sockets. For example CAM module in Camera subsystem 700 sends a message to CIM module in Sensors/Lights sub-system 800 (e.g., indicating that the face is verified), which triggers CIM to turn the entrance light to "green" and make a transition to internal state "verified" in Sensor/Lights sub-systems 800.

The state transition in a particular sub-system may happen through an internal trigger. An example is the transition from "verified" to "in-session" states in Sensors/Lights subsystem 800.

The "Responsible Module" is denoted by "R." "R" indicates the module that executes a specific action, based on a trigger.

The "Trigger mechanism" is denoted by "T."

The "Action taken" is denoted by "A."

When "T" happens, "R" executes "A" and the state changes.

The state diagram 700, e.g., shows an example of a transition from "Camera Free" state 702 to "Camera Busy" state 704. When the face is verified by the camera module, the camera module sends a message to the camera interface module.

Figure 10:
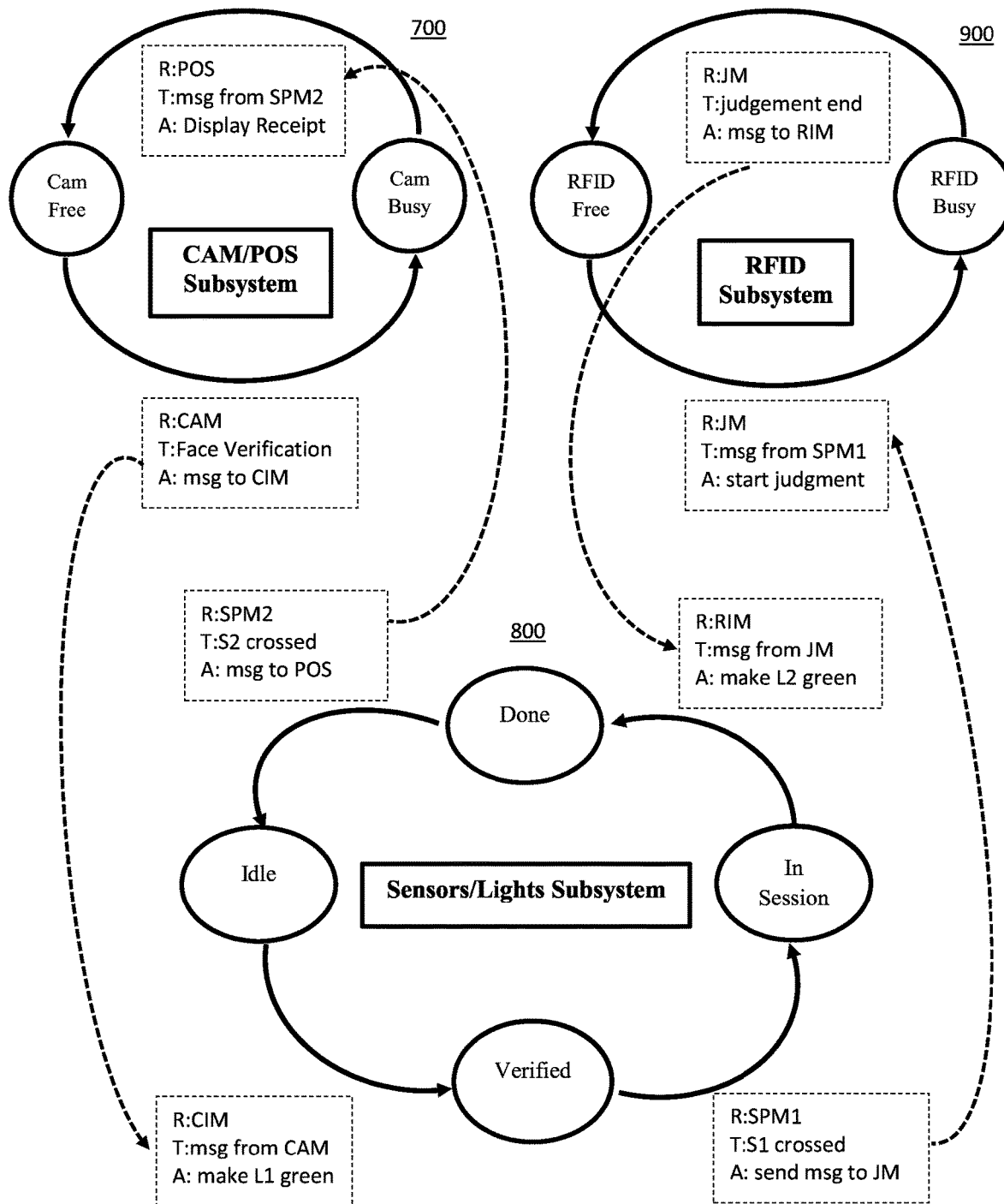
FIG. 10 is a block/flow diagram of an exemplary communication between the camera subsystem, the RFID subsystem, and the sensor and light subsystem, in accordance with embodiments of the present invention.

FIG. 10 is a block/flow diagram of an exemplary communication between the camera subsystem, the RFID subsystem, and the sensor and light subsystem, in accordance with embodiments of the present invention.

The term "CIM" refers to camera code, which detects and verifies the customer face. CAM also sends a message over a socket to CIM upon successful face verification.

The term "CIM" refers to Camera Interface Module. The CIM receives communication from the CAM. The CIM also controls the entrance light.

The term "SPM" refers to a Sensor Processing Module.

The term "SPM1" refers to the entrance sensor, where SPM1 monitors the state of the entrance infrared (IR) sensor. SMP1 also controls both entrance and exit lights. SMP1 also sends a message to the judgement module (JM) when entrance sensor is crossed.

The term "SPM2" refers to the exit sensor, where SPM2 monitors the state of the exit IR sensor. SMP2 also sends a message to POS when exit sensor is crossed.

The term "POS" refers to Point Of Sale code. POS receives the message from SPM2 and displays the sale receipt to the customer.

The term "JM" refers to a Judgement Module, which is an RFID code to differentiate between inside and outside tags. JM receives the message from SPM1 to start the judgement process. JM also sends the message to RIM when the judgement ends.

The term "RIM" refers to a RFID Code Interface Module. RIM waits to receive the message from JM.

In one example, the state transition between the subsystems 700, 800, 900 is invoked by communicating messages through sockets. For example, CAM module in Camera subsystem 700 sends a message to CIM module in Sensors/Lights sub-system 800 (indicating that the face is verified), which triggers CIM to turn the entrance light to green and make a transition to internal state "verified" in Sensor/Lights sub-systems 800.

FIG. 10 illustrates several communications between sub-systems 700, 800, 900.

Figure 11:
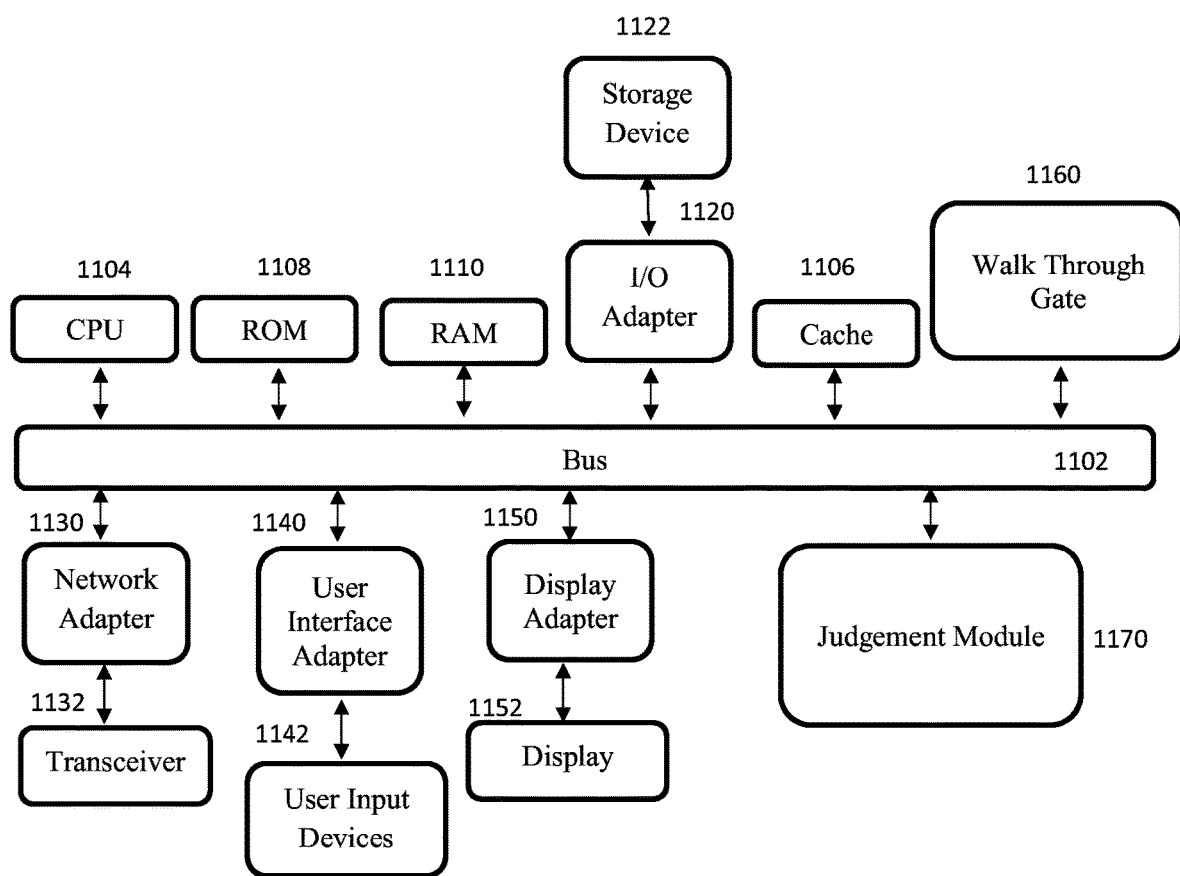
FIG. 11 is a block/flow diagram of an exemplary processing system where the WTG communicates with a network, in accordance with embodiments of the present invention.

FIG. 11 is block/flow diagram of an exemplary processing system where the WTG communicates with a network, in accordance with embodiments of the present invention.

The processing system includes at least one processor or processor device (CPU) 1104 operatively coupled to other components via a system bus 1102. A cache 1106, a Read Only Memory (ROM) 1108, a Random Access Memory (RAM) 1110, an input/output (I/O) adapter 1120, a network adapter 1130, a user interface adapter 1140, and a display adapter 1150, are operatively coupled to the system bus 1102. Walk Through Gate (WTG) 1160 can be employed via the bus 1102. The WTG 1160 can employ a judgement module 1170.

A storage device 1122 is operatively coupled to system bus 1102 by the I/O adapter 1120. The storage device 1122 can be any of a disk storage device (e.g., a magnetic or optical disk storage device), a solid state magnetic device, and so forth.

A transceiver 1132 is operatively coupled to system bus 1102 by network adapter 1130.

User input devices 1142 are operatively coupled to system bus 1102 by user interface adapter 1140. The user input devices 1142 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 1142 can be the same type of user input device or different types of user input devices. The user input devices 1142 are used to input and output information to and from the processing system.

A display device 1152 is operatively coupled to system bus 1102 by display adapter 1150.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A walk-through gate (WTG) comprising:
a WTG structure including a first wall and a second wall, the first and second walls defining a walk-through pass way between an entrance and an exit;
at least one sensor located at the entrance and the exit of a cavity defined by the walk-through pass way;
at least one first antenna facing toward an inside region of the WTG structure;
at least one second antenna facing away from the inside region of the WTG structure;
a radio frequency identification (RFID) reader connected to the at least one first and second antennas;
a judgement module to judge if an RFID tag is located inside or outside the walk-through gate structure; and
curved surface structures incorporated in both the first and second walls of the WTG structure, the curved surface structures extending an entire height of the first and second walls,
wherein an angle of curvature of the curved surface structures is given as:

$$(1-\cos(\alpha=2))=2\sin(\alpha=2)=W=L,$$

where W is a width of the first and second walls, L is a length of the first and second walls, and $\alpha$ is the angle of curvature,
wherein a session has a minimum duration time and a maximum duration time, and
wherein a session time is dynamically adjusted by a judgement algorithm of the judgement module.

2. The walk-through gate of claim 1,
wherein the at least one sensor at the entrance of the WTG structure senses when a user enters the WTG structure; and
wherein the at least one sensor at the exit of the WTG structure senses when the user exits the WTG structure.

3. The walk-through gate of claim 1, wherein the WTG is "in session" within a time period defined as when the user enters and exits the WTG.

4. The walk-through gate of claim 1, wherein in each session, the RFID reader enables an interrogation from the at least one first and second antennas by cycling through the at least one first and second antennas in a predetermined order.

5. The walk-through gate of claim 1, wherein a session duration time is based on a number of antenna cycles.

6. The walk-through gate of claim 1, wherein a session start time is enabled by explicit user interaction such as scanning a card, pushing a button, and interacting with an interactive device such as tablet or touch screen display.

7. The walk-through gate of claim 1, wherein either side of the walk though pass way can be used as the entrance and the WTG recognizes a direction of movement.

8. The walk-through gate of claim 1, wherein a pair of absorbers is disposed within each of the first and second walls, the pair of absorbers extending the entire height of the first and second walls.

9. The walk-through gate of claim 1, wherein the WTG detects if a user exits from a same side that the user has entered.

10. A walk-through gate (WTG) comprising:
a WTG structure including a first wall and a second wall, the first and second walls defining a walk though pass way between an entrance and an exit;
at least one sensor located at the entrance and the exit of a cavity defined by the walk though pass way;
at least one first antenna facing toward an inside region of the WTG structure;
at least one second antenna facing away from the inside region of the WTG structure;
a radio frequency identification (RFID) reader connected to the at least one first and second antennas;
a judgement module to judge if an RFID tag is located inside or outside the walk though gate structure; and
curved surface structures included in both the first and second walls of the WTG structure, the curved surface structures extending an entire height of the first and second walls,
wherein an angle of curvature of the curved surface structures is given as:

$$(1-\cos(\alpha=2))=2\sin(\alpha=2)=W=L,$$

where W is a width of the first and second walls, L is a length of the first and second walls, and a is the angle of curvature; and
wherein the WTG includes at least two states, that is, an "in-session" state and a "not-in-session" state.

11. The walk-through gate of claim 10,
wherein the WTG changes from the "not-in-session" state to the "in-session" state when a user moves from outside the WTG structure to inside the WTG structure, and this motion is detection by the at least one sensor at the entrance; and
wherein the WTG changes from the "in-session" state to the "not-in-session" state when the user moves from inside the WTG structure to outside the WTG structure, and this motion is detection by the at least one sensor at the exit.

12. The walk-through gate of claim 10, wherein the "not-in-session" state is further divided into two states, that is, a "ready-to-verify" state and a "verified" state.

13. The walk-through gate of claim 12, wherein the WTG changes from the "ready-to-verify" state to the "verified" state after user identity is verified.

14. The walk-through gate of claim 13, wherein a verification process employs face recognition, an identification card, or combination thereof.

15. The walk-through gate of claim 10, wherein the "in-session" state is further divided into two states, that is, a "judgement-period" state and a "judgement-completed" state.

16. The walk-through gate of claim 15, wherein the WTG changes from the "judgement-period" state to the "judgement-completed" state when a judgement algorithm has been completed.

17. The walk-through gate of claim 16,
wherein a pair of absorbers is disposed within each of the first and second walls, the pair of absorbers extending the entire height of the first and second walls.

* * * * *